(12) United States Patent
Yao et al.

(10) Patent No.: US 9,359,012 B2
(45) Date of Patent: Jun. 7, 2016

(54) TOLERANCE COMPENSATOR FOR A VEHICLE FRAME

(71) Applicant: Ford Global Technologies, LLC, Dearborn, MI (US)

(72) Inventors: Rong Yao, Troy, MI (US); John T. Reed, Northville, MI (US); Alexandre Costa Henriques, Lauro de Freitas (BR); Gavin Smith, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/560,216

(22) Filed: Dec. 4, 2014

(65) Prior Publication Data
US 2015/0291225 A1    Oct. 15, 2015

Related U.S. Application Data

(63) Continuation-in-part of application No. 14/252,205, filed on Apr. 14, 2014.

(51) Int. Cl.
*B62D 27/06* (2006.01)
*F16B 1/00* (2006.01)
*B62D 25/06* (2006.01)

(52) U.S. Cl.
CPC .............. *B62D 27/065* (2013.01); *F16B 1/00* (2013.01); *B62D 25/06* (2013.01); *F16B 2001/0092* (2013.01)

(58) Field of Classification Search
CPC ...... B62D 27/02; B62D 27/023; B62D 27/06; B62D 27/065

USPC .................. 411/546, 535, 432, 433, 182, 112; 403/409.1; 296/210, 216.06
See application file for complete search history.

(56) References Cited

U.S. PATENT DOCUMENTS

| 2,748,825 | A | * | 6/1956 | Launay | F16B 37/044 411/112 |
| 5,288,191 | A | | 2/1994 | Rückert et al. | |
| 6,225,566 | B1 | * | 5/2001 | Dienst | H01B 17/56 174/138 D |
| 6,357,953 | B1 | * | 3/2002 | Ballantyne | F16B 5/0233 403/365 |

(Continued)

FOREIGN PATENT DOCUMENTS

| CN | 102825997 A | 12/2012 |
| DE | 19753646 A1 | 6/1998 |

(Continued)

OTHER PUBLICATIONS

Britcar (UK) Ltd., "BYH000010—Clip—Retaining Sunroof Motor G-CAT." http://www.brit-car.co.uk/product.php/110707/5497/clip_retaining_sunroof_motor_g_cat. Oct. 25, 2013. 2 pages printed.

*Primary Examiner* — Dennis H Pedder
(74) *Attorney, Agent, or Firm* — Greg P. Brown; Price Heneveld LLP

(57) ABSTRACT

A tolerance compensator for a vehicle frame includes a base member having an upper portion in keyed engagement with a roof structure. The tolerance compensator also has an extension member that is threadably coupled with a lower portion of the base member. A fastener extends up from a body-side structure to threadably engage and move the extension member down into contact with the body-side structure before threadably engaging the base member.

20 Claims, 7 Drawing Sheets

(56) References Cited

U.S. PATENT DOCUMENTS

| | | | |
|---|---|---|---|
| 6,585,447 B2 * | 7/2003 | Schwarzbich | F16B 5/0233 403/299 |
| 6,776,566 B2 | 8/2004 | Kobusch et al. | |
| 7,591,403 B2 | 9/2009 | Binder et al. | |
| 8,202,033 B2 * | 6/2012 | Choi | B62D 25/147 411/535 |
| 8,944,736 B2 * | 2/2015 | Figge | F16B 5/0233 224/322 |
| 2002/0150445 A1 * | 10/2002 | Ozawa | F16B 5/0233 411/546 |
| 2005/0047893 A1 * | 3/2005 | Schwarzbich | F16B 5/0233 411/546 |
| 2006/0226312 A1 * | 10/2006 | Masuch | F16B 37/041 248/188 |
| 2007/0009342 A1 * | 1/2007 | Figge | F16B 5/0233 411/546 |
| 2007/0092355 A1 * | 4/2007 | Burger | F16B 5/0233 411/535 |
| 2007/0207012 A1 * | 9/2007 | Lorenzo | F16B 5/0233 411/546 |
| 2013/0117996 A1 * | 5/2013 | Ducornait | F16B 39/284 29/525.02 |
| 2014/0097218 A1 | 4/2014 | Bittner | |

FOREIGN PATENT DOCUMENTS

| | | |
|---|---|---|
| EP | 2174836 B1 | 1/2012 |
| KR | 20050014154 A | 2/2005 |
| KR | 100828616 B1 | 5/2008 |
| KR | 20080109184 A | 12/2008 |
| WO | 2013060572 A1 | 5/2013 |

\* cited by examiner

TOLERANCE COMPENSATOR FOR A VEHICLE FRAME

CROSS-REFERENCE TO RELATED APPLICATION

This patent application is a continuation-in-part of co-pending U.S. patent application Ser. No. 14/252,205, which was filed on Apr. 14, 2014, entitled "COMPENSATOR ASSEMBLY FOR A VEHICLE FRAME," which has a common Applicant herewith and the entire contents of which is hereby incorporated by reference in its entirety.

FIELD OF THE INVENTION

The present invention generally relates to a tolerance compensator for a vehicle frame, and particularly relates to a tolerance compensator that is capable of extending and securing between spaced apart frame components.

BACKGROUND OF THE INVENTION

It is generally understood that the manufacture and assembly of vehicle frames, especially with the use of laser-brazing and laser-welding, may result in production variance, such that rigid frame components may have various spacings and specific dimensions that are inconsistent. To accommodate such variances, it is common to weld spacers, bend connection brackets, or use other means to fill gaps between the frame components. It is desired for vehicle frames to be assembled with fewer inconsistencies and to utilize lighter weight materials that maintain the structural integrity of the vehicle.

SUMMARY OF THE INVENTION

According to one aspect of the present invention, a tolerance compensator for extending between vehicle frame components includes a base member engaging a keyhole in a first frame component. An extension member is threadably coupled with the base member and has an aperture for receiving a fastener. The fastener unthreads the extension member into contact with a second frame component before threading into a nut coupled with the base member.

According to another aspect of the present invention, a tolerance compensator for a vehicle frame includes a base member having an upper portion in keyed engagement with a roof structure. The tolerance compensator also includes an extension member threadably coupled with a lower portion of the base member. A fastener extends up from a body-side structure to threadably engage and move the extension member down into contact with the body-side structure before threadably engaging the base member.

According to another aspect of the present invention, a method for installing a tolerance compensator includes providing an extension member threadably coupled with a base member. The base member is engaged with an opening in a roof assembly. The roof assembly is then attached to a vehicle frame defining a gap between the opening and a body-side structure. A fastener is inserted through the body-side structure and rotated to unthread the extension member to fill the gap before engaging the base member.

According to yet another aspect of the present invention, a moon roof assembly for attaching to a vehicle frame includes a support structure with a keyhole having a base member of a tolerance compensator in keyed engagement therewith. The tolerance compensator also includes an extension member threadably coupled with a lower portion of the base member. The support structure is configured to be spaced from a body-side structure of the vehicle frame upon attachment of the moon roof assembly therewith. Further, the extension member is configured to receive a fastener and fill the spacing upon rotation of the fastener by unthreading down into abutting contact with the body-side structure. The fastener proceeds to threadably engage the base member after the extension member abuts the body-side structure, thereby securing the moon roof assembly to the body side structure.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a bottom perspective view of a tolerance compensator engaged between a moon roof assembly and a body-side structure, according to one embodiment;

DETAILED DESCRIPTION OF THE PREFERRED EMBODIMENTS

Figure 1:
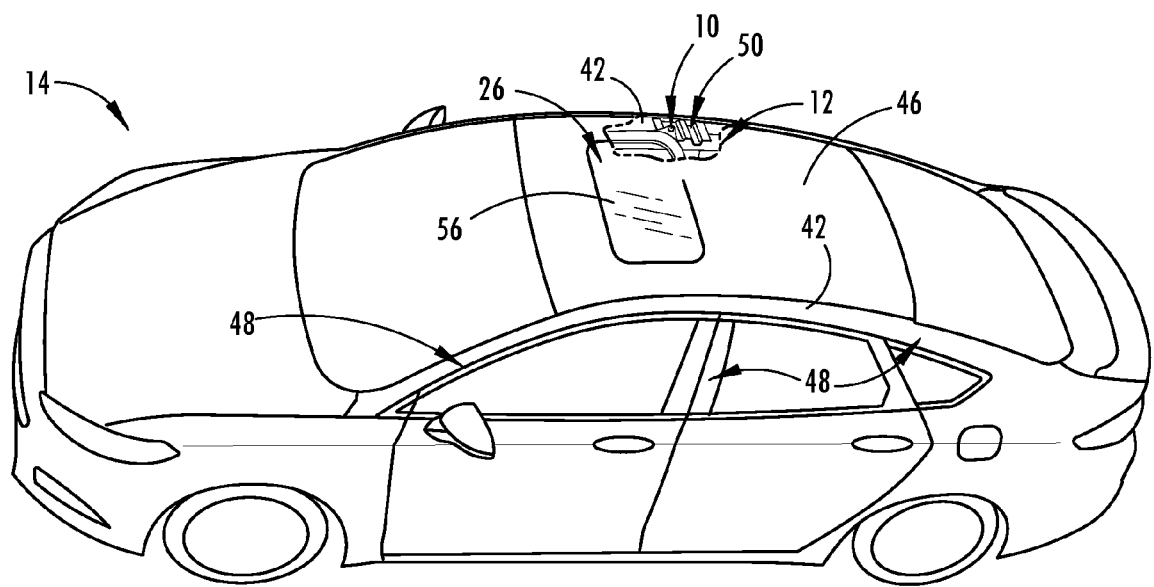
FIG. 1 is a top perspective view of a vehicle having a moon roof assembly attached to a body-side structure of a vehicle frame, according to one embodiment.

For purposes of description herein, the terms "upper," "lower," "right," "left," "rear," "front," "vertical," "horizontal," and derivatives thereof shall relate to the embodiment of the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-12, reference numeral 10 generally designates a tolerance compensator for extending between spaced apart components of a frame 12 for a vehicle 14. In one embodiment, the tolerance compensator 10 includes a base member 16 that engages a keyhole opening 18 in a first frame component 20. The base member 16 may have an upper portion 22 that is in keyed engagement with the first frame component 20. In one embodiment, the first frame component 20 is a laser-brazed roof structure, shown as a structural component 24 of a moon roof assembly 26, which is spaced from a second frame component, shown as a body-side structure 28 of the vehicle frame 12. The spacing results from the variability in setting the roof structure to the body-side structure 28. The tolerance compensator 10 includes an extension member 30 threadably coupled with a lower portion 32 of the base member 16. In one embodiment, the extension member 30 has an aperture 34 for receiving a fastener 36 that unthreads the extension member 30 into contact with the second frame component 28, thereby supporting a gap 38 between the first and second frame components 20, 28. In the illustrated embodiment, the fastener 36 has threads in the opposite direction from the extension member 30, such that it extends up from the body-side structure 28 to threadably engage and rotate the extension member down into contact with the body-side structure before continuing to thread upward into engagement with a nut 40 coupled with the base member 16. However, it is contemplated that the first and second frame components 20, 28 may be various portions of the vehicle frame 12 that are spaced apart by a gap upon assembly.

Referring now to FIG. 1, the illustrated embodiment of the vehicle 14 is shown with an area of the vehicle frame 12 exposed to illustrate one of the roof rails 42 extending longitudinally on opposing sides of a moon roof assembly 26. In the illustrated embodiment, the roof rails 42 are supported by pillars 48 that extend upward around an interior cabin of the vehicle 14, as generally understood by one having ordinary skill in the art. The roof rails 42, pillars 48, moon roof assembly 26, and roof 46 are all illustrated examples of frame components of the vehicle 14, although additional frame components, such as roof bows, are also contemplated for incorporating a tolerance compensator 10 as described herein. It is also conceivable that the tolerance compensator 10 may be incorporated in vehicle frames of alternative types of vehicles that may have different frame components or roof configurations.

As illustrated in FIG. 2, the vehicle frame 12 includes a handoff bracket 50 extending laterally inward from a roof rail 42 of the vehicle frame 12, proximate the B-pillar 48, together defining one embodiment of the body-side structure 28. The handoff bracket 50, in the illustrated embodiment, is formed to have a substantially vertical portion 52 that attaches with the roof rail 42 and a substantially horizontal portion 54 that is configured with a generally planar body for attaching to the moon roof assembly 26. The moon roof assembly 26, in the illustrated embodiment, includes a structural component 24, also referred to as a ring reinforcement, that surrounds a glass portion 56 (FIG. 1) of the moon roof assembly 26. The illustrated structural component 24 has a support flange 58 that protrudes laterally from the glass portion 56 and downward for engaging the handoff bracket 50. The support flange 58 has an attachment location that generally aligns in vertical orientation with the horizontal portion 54 of the handoff bracket 50, defining a tolerance gap 38 (FIG. 9) between the handoff bracket 50 and the structural component 24 of the moon roof assembly 26. It is appreciated that the tolerance gap 38 may vary in size across a plurality of vehicle frames that are manufactured for the same type of vehicle, such that the tolerance compensator 10 accommodates various gap sizes. It is also contemplated that a gap may vary at different locations between a moon roof assembly and a body-side structure or between other vehicle frame components that are fastened to one another, which may also be accommodated with a tolerance compensator according to additional embodiments of the present invention.

Figure 2A:
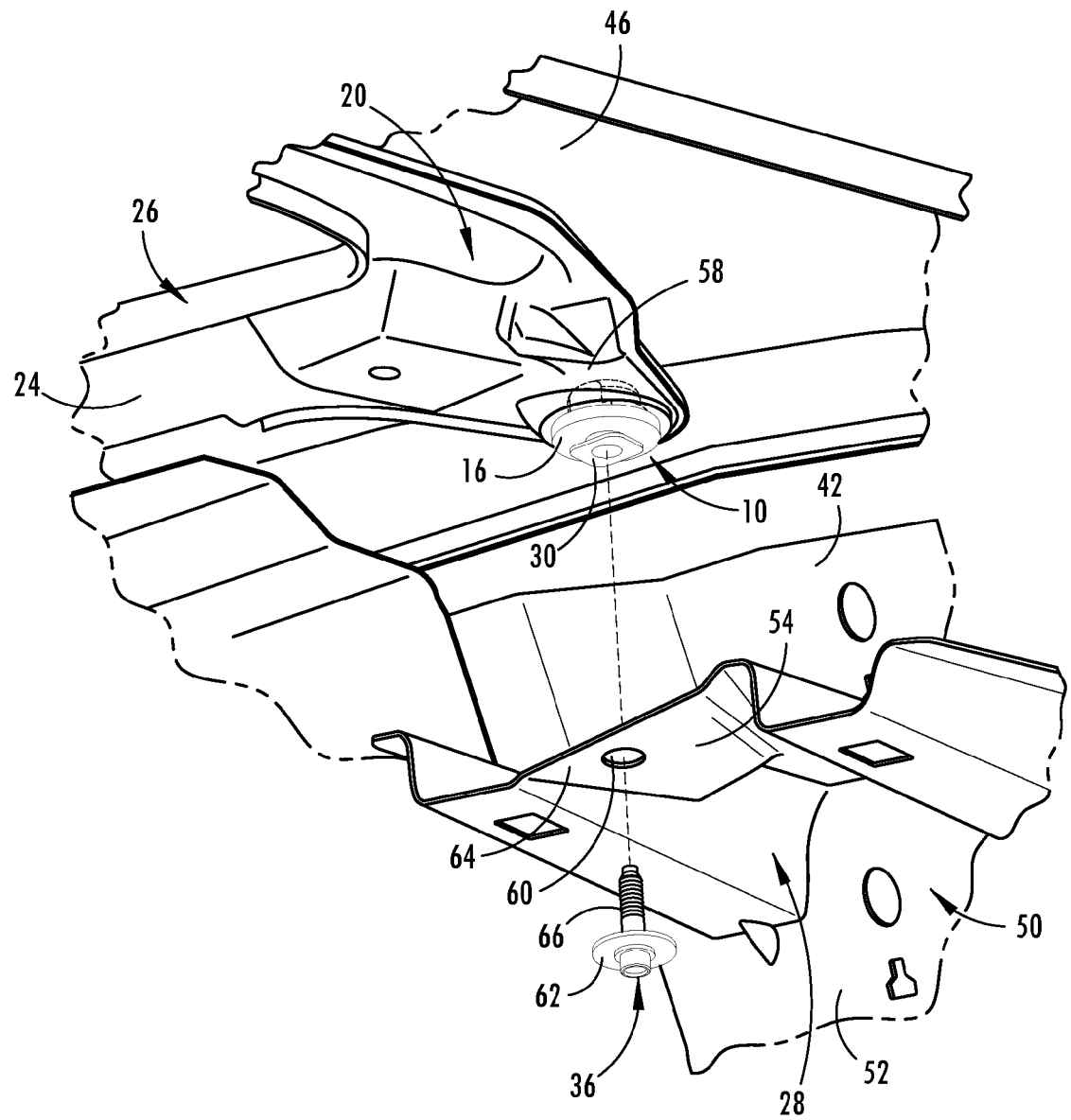
FIG. 2A is an exploded bottom perspective view of the tolerance compensator shown in FIG. 2, having a fastener disengaged and the moon roof assembly exploded away from the body-side structure.
Figure 2B:
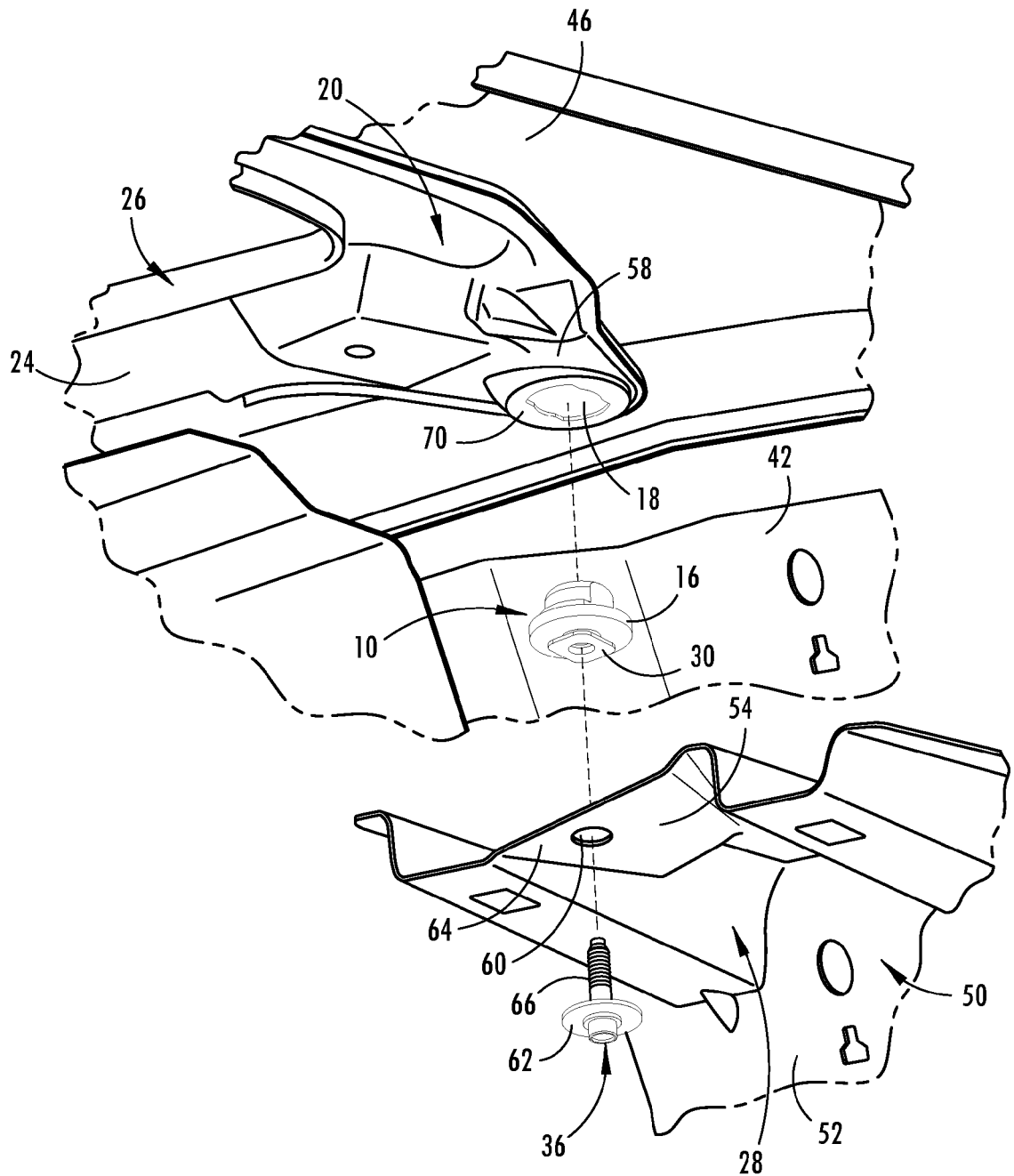
FIG. 2B is an exploded bottom perspective view of the tolerance compensator shown in FIG. 2, having the tolerance compensator disengaged from a keyhole in the moon roof assembly.

As shown in FIGS. 2A-2B, the horizontal portion 54 of the handoff bracket 50 includes an attachment opening 60 extending vertically through the generally planar body of the handoff bracket 50 proximate an edge thereof; although, it is contemplated that the attachment opening may be alternatively located or oriented. In the illustrated embodiment, the attachment opening 60 is vertically aligned with the keyhole opening 18 in the moon roof assembly 26, such that a fastener 36 may extend through the attachment opening 60 and engage the tolerance compensator 10 coupled with the keyhole opening 18 to support the gap between the handoff bracket 50 and the structural component 24 of the moon roof assembly 26. As such, a head 62 of the fastener 36 shown in the illustrated embodiment has a greater diameter than the attachment opening 60 for retaining the head 62 against a lower side 64 of the handoff bracket 50 and also allowing a threaded shank portion 66 of the fastener 36 to engage the extension member 30 and the base member 16 of the tolerance compensator 10, as described in more detail below.

Figure 3:
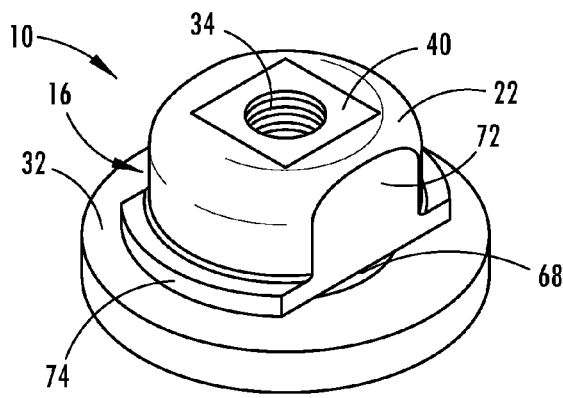
FIG. 3 is a top perspective view of a tolerance compensator, according to one embodiment.
Figure 4:
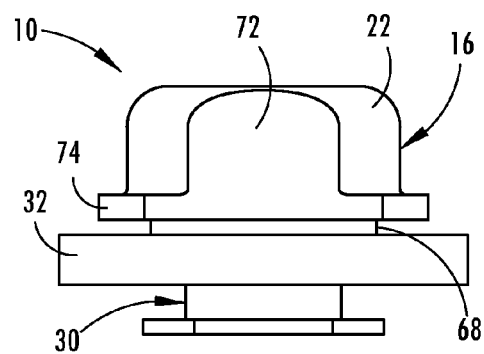
FIG. 4 is a side elevation view of the tolerance compensator shown in FIG. 3.
Figure 5:
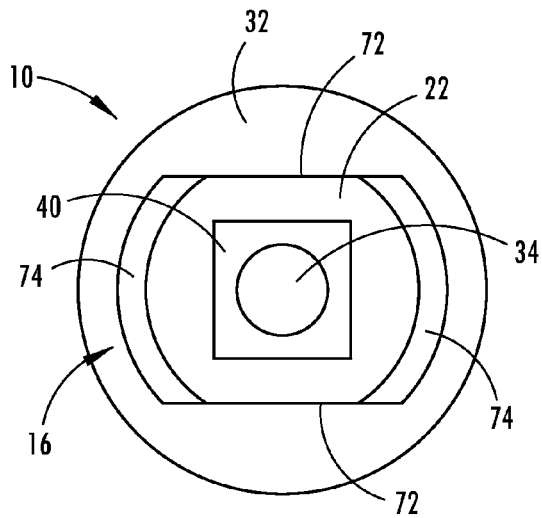
FIG. 5 is a top plan view of the tolerance compensator shown in FIG. 3.
Figure 6:
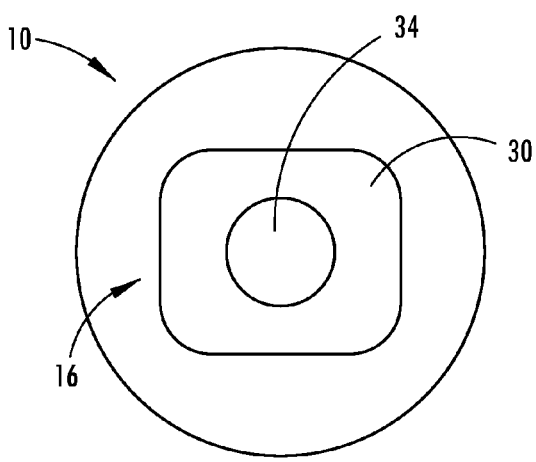
FIG. 6 is a bottom plan view of the tolerance compensator shown in FIG. 3.
Figure 7:
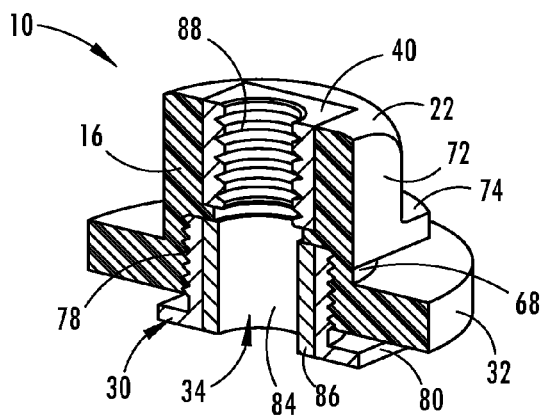
FIGS. 7 and 8 are cross-sectional top perspective views of the tolerance compensator shown in FIG. 3, illustrating a base member and an extension member of the tolerance compensator, according to one embodiment.
Figure 8:
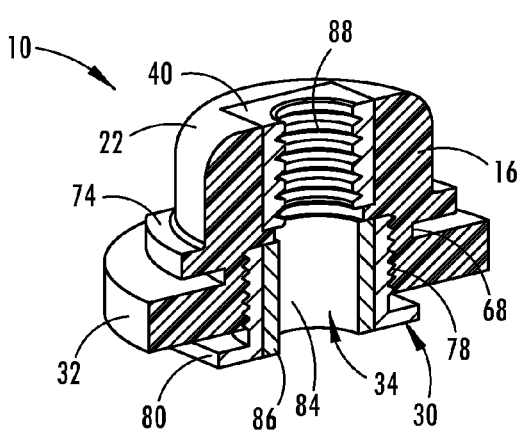

Still referring to FIGS. 2A-2B, the keyhole opening 18 in the support flange 58 of the moon roof assembly 26 is shaped and otherwise configured to engage the base member 16 of the tolerance compensator 10 prior to the moon roof assembly 26 being attached to the vehicle frame 12. To prepare the moon roof assembly 26 for attachment, the base member 16 of the tolerance compensator 10 is placed into keyed engagement with the keyhole opening 18. To provide the keyed engagement, the base member includes a neck section 68 between an upper portion 22 and a lower portion 32 of the base member 16 (FIG. 3). The keyhole opening 18 is sized and shaped for the upper portion 22 of the base member 16 to align with and pass through the keyhole opening 18, such that upon the neck section 68 being within the keyhole opening 18, the base member 16 may then be rotated to misalign the upper portion 22 with the keyhole opening 18. This misalignment causes the neck section 68 to engage the keyhole opening 18 and the upper portion 22 of the base member 16 to abut an edge 70 of the keyhole opening 18, thereby retaining the base member 16 to the moon roof assembly 26. It is conceivable that the keyed engagement may be alternatively achieved to attach the base member 16 with the support flange 58 of the moon roof assembly 26 prior to attaching it to the body-side structure 28 of the vehicle frame 12.

Referring now to FIGS. 3-8, the base member 16 shown in the illustrated embodiment of the tolerance compensator 10 includes a substantially disk-shaped lower portion 32 with the neck section 68 separating it from the upper portion 22. The lower portion 32 is configured to be larger than the neck section 68 and the keyhole opening 18 (FIG. 2B) to retain the base member 16 to the support flange 58. Similarly, the upper portion 22, in the illustrated embodiment, is sized greater than the neck section 68, but is cylindrically shaped with vertical cutaways to define perpendicular walls 72 on opposing sides of the upper portion 22 and a non-circular shape in the plane parallel with the keyhole opening 18. In conjunction with the keyhole opening 18, the non-circular shape is formed so that a section of the upper portion 22 abuts the edge 70 of the keyhole opening 18 after being inserted through the keyhole opening 18 and rotated. Accordingly, it is contemplated that in additional embodiments the upper portion 22 of the base member 16 and the keyhole opening 18 may have alternative conforming shapes that provide a keyed engagement. More specifically, the illustrated embodiment of the upper portion 22 includes a retention flange 74 that protrudes laterally between the opposing perpendicular walls 72 from a bottom area of the upper portion 22 adjacent to the neck section 68. This retention flange 74 is configured to abut an upper surface 76 (FIG. 9) of the support flange 58 of the moon roof assembly 26 on the edge of the keyhole opening 18. To provide a secure engagement of the base member 16 with the moon roof assembly 26, the neck section 68 in the illustrated embodiment, has a height substantially equal to a thickness of the support flange 58 of the moon roof assembly 26 proximate the keyhole opening 18. However, it is contemplated that the neck section 68 may have a larger height in additional embodiments. The neck section 68 defines a narrowed dimension between the upper and lower portions 22, 32 of the base member 16 that is configured to engage the edge 70 of the keyhole opening 18, thereby retaining the base member 16 to the roof structure 24.

As also illustrated in FIGS. 3-8, the extension member 30 is shown threadably coupled with the lower portion of the base member 16. The illustrated embodiment, the extension member 30 includes a generally cylindrical shape with threads 78 around an upper area thereof for threadably engaging the base member 16. A lower area of the extension member 30 has a base flange 80 that protrudes laterally outward and is configured to abut the upper side 82 (FIG. 9) of the body-side structure 28 when the extension member 30 unthreads away from the base member 16, thereby filling a gap 38 defined between the roof structure 24 and the body-side structure 28. The illustrated embodiment of the extension member 30 also includes an aperture 34 that is coaxially aligned with the cylindrical shape of the extension member 30 and the upper portion 22 of the base member 16. The aperture 34 defines an interior surface 84 of the extension member 30 that threadably engages the fastener 36 with a higher coefficient of friction than the coefficient of friction between the extension member 30 and the base member 16. This difference in friction results in the extension member 30 unthreading from the base member 16 before the fastener 36 threads beyond the extension member 30 to engage the nut 40, as described in more detail below.

Still referring to FIGS. 3-8, in the illustrated embodiment, the interior surface 84 of the extension member 30 has a diameter sized to threadably engage the fastener 36 with such a higher coefficient of friction. Also, the illustrated embodiment includes a sleeve 86 fixed within the aperture 34 of the extension member 30 to provide the interior surface 84. The sleeve 86, in the illustrated embodiment, has a tubular shape with an outer surface that is configured to fixedly engage the extension member 30 and has an inner surface configured to provide the interior surface 84 described above. In some embodiments, the sleeve 86 may have protrusions that extend along the inner surface or various other shapes. It is also contemplated that the sleeve 86 may be formed of elastomeric materials, including rubber, synthetic elastomers, and composites, polymer materials, metal materials, and other conceivable combinations of materials configured to provide the interior surface 84 with such a coefficient of friction with the corresponding fastener 36, as described herein. Furthermore, it is contemplated that the sleeve 86 may be fixed to the extension member 30 with adhesive or other coatings and likewise may include an adhesive or other coating on the interior surface that engages the fastener 36. However, it is contemplated that the sleeve 86 may be omitted or alternatively integrated into the extension member 30 in additional embodiments.

Figure 10:
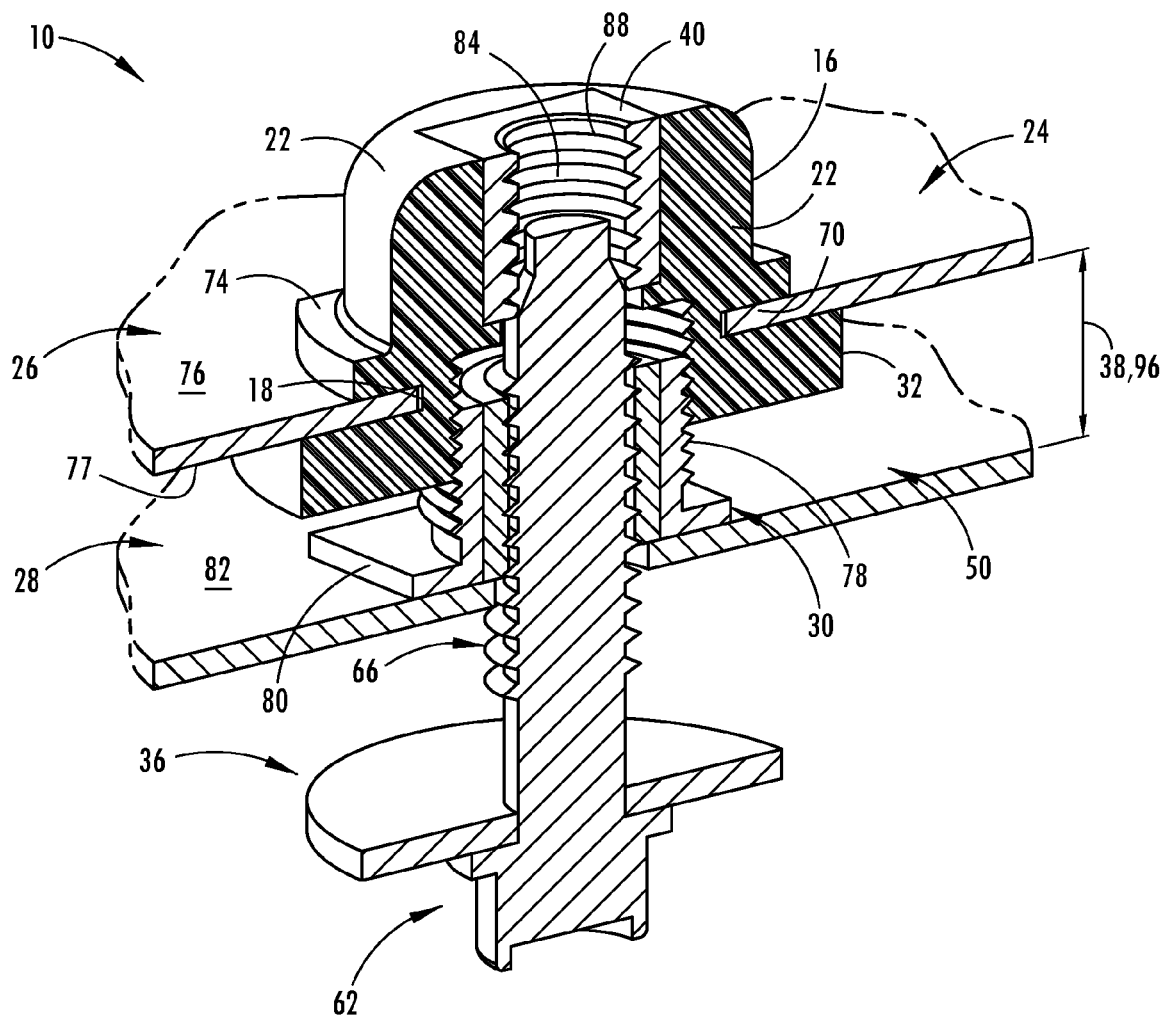
FIG. 10 is a cross-sectional view of the tolerance compensator shown in FIG. 9, having a fastener engaged with an extension member that is unthreaded down into contact with the second frame component to position the tolerance compensator at a deployed length, according to one embodiment.

With further reference to the base member 16 of the tolerance compensator 10 illustrated in FIGS. 3-8, a nut 40 is coupled with the upper portion 22 thereof. The nut 40 has a central threaded passage 88 that is aligned with the aperture 34 in the extension member 30, such that the fastener 36 threadably engages the nut 40 after the extension member 30 moves into abutting engagement with the body-side structure 28 (FIG. 10). In the illustrated embodiment, the nut 40 is integrally coupled with the upper portion 22 of the base member 16 on an opposing side of the keyhole opening 18 from the extension member 30. It is also contemplated that in additional embodiment the nut 40 may be integrally formed into the upper portion 22 of the base member 16, whereby the base member 16 comprises a uniform material and includes a central threaded passage aligned with the aperture 34 in the extension member 30. The nut 40, in some embodiments, may be formed from metal or polymeric materials configured to engage the fastener 36 and withstand corresponding forces.

Figure 9:
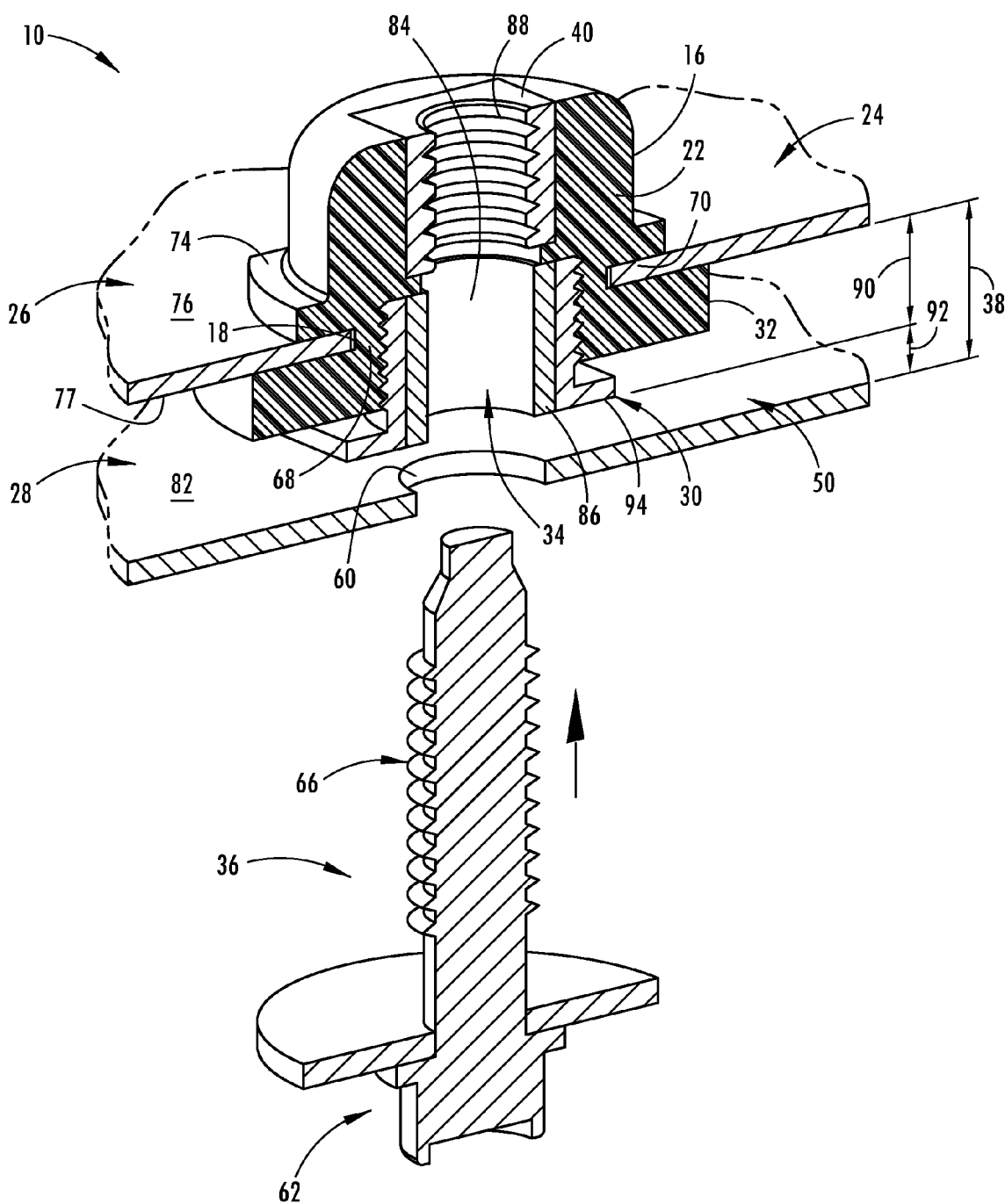
FIG. 9 is a cross-sectional top perspective view of a tolerance compensator engaged to a first frame component that is spaced from a second frame component with the tolerance compensator positioned at an installation length, according to one embodiment.

Referring now to FIG. 9, the base member 16 shown in keyed engagement with the keyhole opening 18 aligning the aperture 34 in the extension member 30 with the attachment opening 60 in the handoff bracket 50. Specifically, before the moon roof assembly 26 was moved into the attachment position shown in FIG. 9, the upper portion 22 of the base member 16 was aligned and inserted up through the keyhole opening 18, placing the lower portion 32 of the base member 16 into abutting contact with the lower surface 77 of the moon roof assembly 26, and thereafter the base member 16 was rotated approximately ninety degrees to misalign the upper portion 22 of the base member 16 with the keyhole opening 18. After engaging the tolerance compensator 10 with the moon roof assembly 26, the moon roof assembly 26 is moved into the attachment position and the gap 38 between the handoff bracket 50 and the structural component 24 of the moon roof assembly 26 is defined between the upper side 82 of the handoff bracket 50 and the lower surface 77 of the structural component 24. It is understood that the gap 38 in the illustrated embodiment is defined after the moon roof assembly 26 is installed onto the vehicle frame 12; although, it is contemplated that the gap 38 may be alternatively defined in additional embodiments. In the illustrated embodiment, the tolerance compensator 10 is shown with the base member 16 and the extension member 30 in an installation length 90, which may be defined as the extension member 30 threaded upward as far as permitted into the base member 16. As illustrated, the installation length 90 leaves a spacing 92 between an abutment surface 94 of the extension member 30 upper side 82 of the body-side structure 28. The tolerance compensator 10 is configured to extend from the installation length 90 to a deployed length 96 (FIG. 10) that fills the spacing 92 and thereby supports the gap 38. It is appreciated that the compensator may accommodate varied spacing that results from frame 12 manufacturing.

To extend the illustrated embodiments of the tolerance compensator 10, as shown in FIG. 10, the threaded shank 66 of the fastener 36 is inserted through the handoff bracket 50 into the engagement with the interior surface 84 of the aperture 34 within the extension member 30. The fastener 36 is rotated, such that the extension member 30 is threaded away from the base member 16. As such, the base member 16 remains generally fixed relative to the handoff bracket 50, allowing the rotation of the fastener 36 to cause the extension member 30 to rotate relative to the base member 16 and unthread therefrom. More specifically, the threaded shank portion 66 of the fastener 36 frictionally engages the interior surface 84 of the aperture 34 to define a first coefficient of friction between the fastener 36 and the extension member 30. The first coefficient of friction is greater than a second coefficient of friction between the base member 16 and the threads 78 of the extension member 30. As such, in the illustrated embodiment, the fastener 36 does not extend beyond the extension member 30 until the extension member 30 contacts the handoff bracket 50, which increases the force necessary to further unthread the extension member 30 from the base member 16 and results in the force being less for the fastener 36 to rotate relative to the extension member 30 and extend further downward. Accordingly, rotation of the fastener 36 does not overcome the first coefficient of friction until the extension member 30 abuts the moon roof assembly 26, prohibiting further unthreading of the extension member 30 from the base member 16, defining the deployed length.

Figure 11:
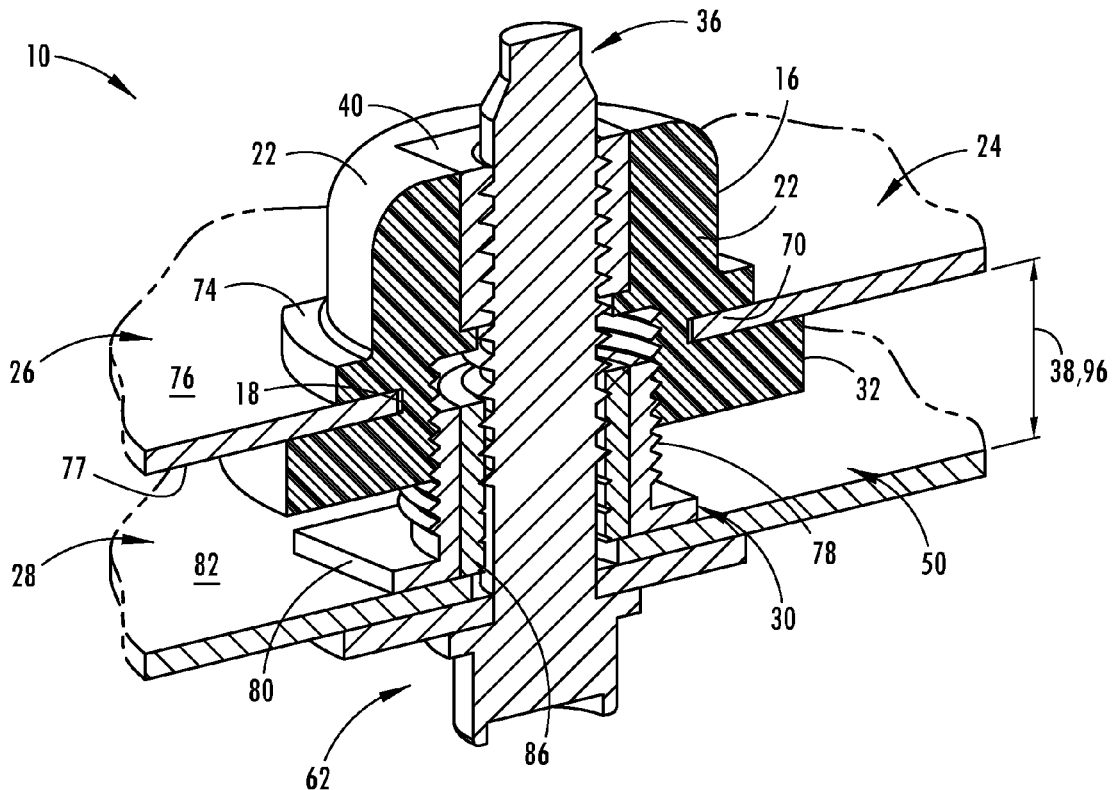
FIG. 11 is a cross-sectional view of the tolerance compensator shown in FIG. 9, having the fastener threaded beyond the extension member and engaged with the base member of the tolerance compensator, thereby engaging between the first and second frame components, according to one embodiment.

As illustrated in FIG. 11, the base member 16 and the extension member 30 are in the deployed length 96, supporting the gap 38 between the handoff bracket 50 and the moon roof assembly 26. Once in the deployed length 96, further rotation of the fastener 36 overcomes the first coefficient of friction causing the fastener 36 to thread beyond the extension member 30 and threadably engage the upper portion 22 of the base member 16. More specifically, the threaded portion 66 of the fastener 36 engages the nut 40 integrally coupled with the upper portion 22 of the base member 16, in illustrated embodiment. Accordingly, fastener 36 threads into the base member 16 until the head 62 of the fastener 36 secures against the handoff bracket 50. Tightening the fastener 36 generates a compression force between the moon roof assembly 26 and the handoff bracket 50, which is opposed by the deployed length 96 of the tolerance compensator 10 to provide a secure and substantially rigid connection.

Figure 12:
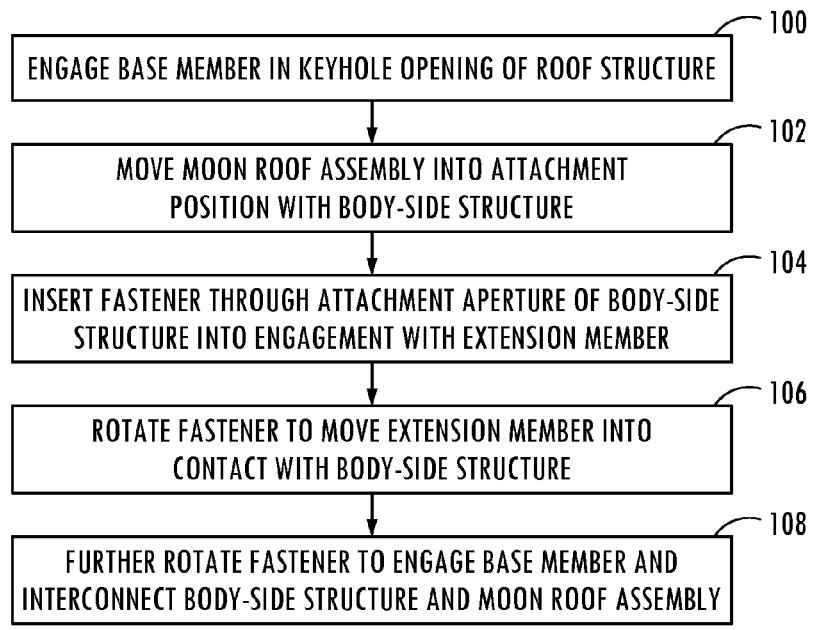
FIG. 12 is a flow chart of a method for installing a tolerance compensator to support a gap between a moon roof assembly and a body-side structure, according to one embodiment.

With reference to FIG. 12, a method for supporting a gap 38 between first and second frame components 20, 28 using a tolerance compensator 10 of the present invention is illustrated according to one embodiment and further described as follows. Initially, at step 100, a base member 16 of the tolerance compensator 10 is engaged in the keyhole opening 18 of the roof structure 24. More specifically, the upper portion 22 of the base member 16 is aligned and inserted through the keyhole opening 18 and then rotated to misalign with the keyhole opening 18 and provide a keyed engagement between the tolerance compensator and the first frame component 20. At step 102, the first frame component 20 is moved into an attachment position that aligns the keyhole opening with an attachment opening 60 in the second frame component 28. At step 104, the method then provides inserting a fastener 36 through the attachment opening 60 and into engagement with an extension member 30 that is threadably coupled with the base member 16. The fastener 36 may be frictionally retained to the extension member 30 by an intermediate sleeve 86 frictionally retained therebetween. Further, at step 106, the method provides rotating the fastener 36, which unthreads the extension member 30 away from the base member 16 until it contacts the second frame component 28. At step 108, the method then provides further rotating the fastener 36 after the extension member 30 is abutting the second frame component 28, causing the fastener 36 to threadably engage the base member 16, namely a nut 40 integrally coupled therewith.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A tolerance compensator for extending between vehicle frame components, comprising:

a base member engaging a keyhole in a first frame component; and an extension member threadably coupled with the base member and having an elastomeric friction-increasing sleeve frictionally disposed in an aperture of the extension member for receiving a fastener that unthreads the extension member and sleeve into contact with a second frame component before threading into a nut coupled with the base member.

2. The tolerance compensator of claim 1, wherein the nut is integrally coupled with a first portion of the base member on an opposing side of the keyhole from the extension member.

3. The tolerance compensator of claim 1, wherein the nut is aligned with the aperture in the extension member, such that the fastener engages the nut after the extension member moves into abutting engagement with the second frame component, wherein the sleeve defines the entire interior surface of the extension member.

4. The tolerance compensator of claim 1, wherein the first frame component includes a ring reinforcement of a moon roof assembly and the second frame component includes a body-side structure.

5. The tolerance compensator of claim 1, wherein the base member includes a neck section between a first portion and a second portion of the base member, and wherein the neck section is configured to engage the keyhole and retain the base member to the first frame component.

6. The tolerance compensator of claim 5, wherein the nut is coupled with the first portion of the base member and the extension member is threadably coupled with the second portion of the base member.

7. The tolerance compensator of claim 5, wherein the first portion of the base member is shaped to pass through the keyhole when in alignment therewith and to abut an edge of the keyhole when misaligned therewith, such that the base member is rotatable to misalign the first portion and engage the neck section with the edge of the keyhole.

8. The tolerance compensator of claim 1, wherein the extension member unthreads away from the base member to abut an upper side of the second component and align the aperture with an opening in the second component for the fastener, such that a head of the fastener abuts a lower side of the second component.

9. The tolerance compensator of claim 1, wherein the base member and the extension member are movable from an installation length spaced from the second frame component to a deployed length abutting the second frame component.

10. A tolerance compensator for a vehicle frame, comprising:
a base member having an upper portion in keyed engagement with a roof structure, the upper portion including a nut;
an extension member threadably coupled with a lower portion of the base member; and
a fastener extending up from a body-side structure to threadably engage and move the extension member down into contact with the body-side structure before threadably engaging the base member, wherein an elastomeric friction-increasing sleeve disposed in the extension member frictionally engages the extension member and the fastener to rotate the elastomeric friction-increasing sleeve and the extension member with the fastener, wherein the fastener engages the nut and sleeve such that the fastener is free of direct engagement with the base member and the extension member.

11. The tolerance compensator of claim 10, wherein the upper portion of the base member extends through an opening in the roof structure and a neck section of the base member engages the opening.

12. The tolerance compensator of claim 11, wherein the neck section defines a narrowed dimension between the upper and lower portions of the base member that is configured to engage the opening and retain the base member to the roof structure.

13. The tolerance compensator of claim 11, wherein the base member is rotatable to misalign the upper portion with the opening and engage the neck section with an edge of the opening.

14. The tolerance compensator of claim 10, wherein the nut is coupled with the base member for the fastener to threadably engage after the extension member abuts the body-side structure.

15. The tolerance compensator of claim 14, wherein the nut is integrally coupled with the upper portion of the base member on an opposing side of the opening from the extension member.

16. The tolerance compensator of claim 10, wherein the extension member is configured to unthread away from the base member to fill a gap defined between the roof structure and the body-side structure.

17. The tolerance compensator of claim 10, wherein a threaded shank of the fastener extends through a corresponding opening in the body-side structure and a head of the fastener abuts a lower side of the body-side structure opposite an upper side of the body-side structure aligned to abut the extension member.

18. A method for installing a tolerance compensator, comprising:
providing an extension member threadably coupled with a base member;
disposing a elastomeric friction-increasing sleeve within an aperture of the extension member;
engaging the base member with an opening in a roof assembly;
attaching the roof assembly to a vehicle frame defining a gap between the opening and a body-side structure; and
inserting a fastener through the body-side structure and rotating the fastener to unthread the extension member to fill the gap before engaging the base member, wherein threaded engagement between the fastener and the friction-increasing sleeve causes the extension member and friction-increasing sleeve to rotate with the fastener.

19. The method of claim 18, wherein a nut is integrally coupled with a first portion of the base member on an opposing side of the opening from the extension member, wherein the fastener engages the nut and the sleeve such that the fastener is free of direct engagement with the base member and the extension member.

20. The method of claim 18, wherein a head of the fastener abuts a lower side of the body-side structure and the extension member abuts an upper side of the body-side structure.

* * * * *